W. C. Travis.
Governor.
No. 1,051.
Reissued Sep. 25, 1866
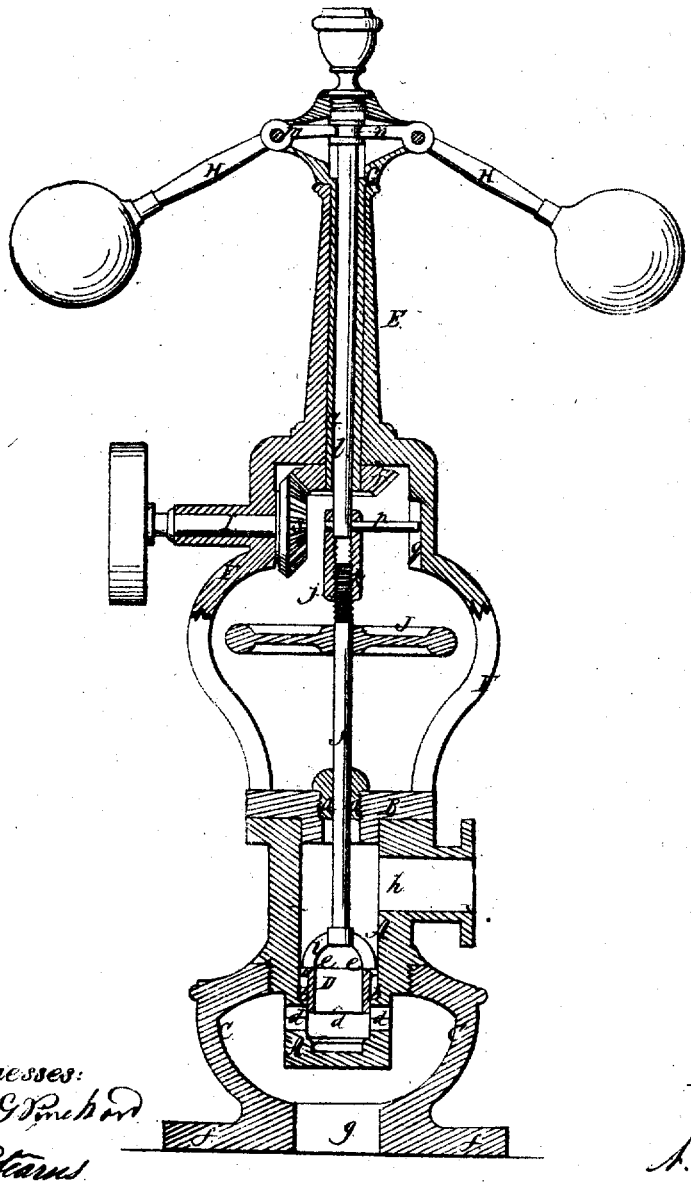
Witnesses:
William G. Pinchard
A. E. Stearns
Inventor:
A. C. Travis

UNITED STATES PATENT OFFICE.

NATHAN C. TRAVIS, NATHAN JOHNSON, AND RICHARD EMERSON, OF ALTON, ILLINOIS, ASSIGNEES OF N. C. TRAVIS.

IMPROVED REGULATOR-VALVE FOR STEAM-ENGINES.

Specification forming part of Letters Patent No. 25,794, dated October 11, 1859; Reissue No. 1,051, dated September 25, 1860.

*To all whom it may concern:*

Be it known that we, NATHAN C. TRAVIS, NATHAN JOHNSON, and RICHARD EMERSON, all of Alton, in the county of Madison and State of Illinois, have, by assignment duly recorded in the Patent Office, become the owners of all right, title, and interest in the invention of a new and Improved Balanced Regulating and Stop Valve for Steam-Engines, made by NATHAN C. TRAVIS, aforesaid; and we do hereby declare that the following is a full, clear, and exact description of the same, reference being had to the accompanying drawing, forming part of this specification, said drawing representing a vertical section of the valve with governor and stop-screw applied.

A is the valve-box, of upright cylindrical form, having a closed bottom and a close cover, B, fitted with a stuffing-box, *a*. *b* and *c* are two valve-seats, of the form commonly used for puppet-valves—one at or near the bottom of the box and the other some distance above—the upper seat, *b*, being larger than the lower one, *c*. *d d* are openings in the sides of the box, two or more in number, arranged at equal distances apart around the box at the same elevation. These openings may be of the "diamond" or rhombic form represented, but should preferably be of a quadrangular form, and of a length in a horizontal direction greater than the depth in a vertical direction. C is an annular steam-casing surrounding the lower part of the valve-box A, and communicating with the interior of the said box by the openings *d d*. This casing, into which the valve-box is screwed, forms a base to the valve-box, and has an opening, *g*, in the bottom surrounded by a flange, *f*, by which it is to be bolted to the steam-chest or steam-pipe of the engine. Above the upper valve-seat, *b*, and above the casing C, is the inlet *h* of the valve-box, to which is to be bolted the steam-pipe from the boiler.

D is the valve, consisting of a short hollow cylinder, having a narrow flange, *e*, round its upper part, and having its lower extremity and the lower face of its flange *e* beveled, like the faces of ordinary valves, and fitted to the two seats *b* and *c*, said seats and faces being at such distances apart that the valve may fit steam-tight into both seats at once. The cylindrical portion of the exterior of the valve below the flange *e* is fitted to work snugly, but easily, within the cylindrical portion of the interior of the box A, between the seats *b* and *c*. The valve has a bridge-piece, *i*, across its top, connecting it with the stem *j*, which works through the stuffing-box *a*, and which has a screw-thread, *j'*, cut on its upper part to fit the screwed interior of a socket, *k*, which is fast on the lower end of the governor-rod *l*.

E is a pillar which supports the governor, erected upon a bridge-piece, F, on the cover B of the valve-box, directly over the center of the valve. G is the main spindle of the governor, made hollow and fitted to rotate within the pillar E. H H are the ball-arms, attached to the spindle by pins *m m*, and having their upper and inner extremities fitted into a groove, *n*, in the head of the rod *l*, which is suspended therefrom within the main spindle, and which is prevented turning with the governor, though permitted to work up and down with the movement of the balls and arms by means of an arm, *p*, which projects from its socket *k* into a vertical groove, *q*, provided in the bridge-piece F. I is the driving-shaft of the governor, geared with the main spindle G by a pair of bevel-gears, *r s*. J is a hand-wheel on the valve-stem, for adjusting or closing the valve.

The valve is raised and lowered in the box A, and thereby caused to uncover a less or greater portion of the several openings *d d* of the valve-box by the changes in the plane of revolution of the governor-balls, consequent upon increased or diminished velocity, the rise of the balls giving a diminished opening, and vice versa, and the supply of steam being consequently in proportion to the demands of the engine, whose velocity is thus kept as nearly uniform as is practicable. The steam entering the box at *h* passes down through the interior of the valve, under the bottom thereof, and through the openings *d d* into the hollow base or casing C, and thence through the outlet *g* to the steam-chest of the engine. As the valve is exposed alike on all corresponding parts of its surface to the steam, it is perfectly balanced, and therefore works with the greatest freedom. When it is desired to stop the engine, the valve, though connected with the governor, may be screwed down like an ordinary stop-valve by turning the wheel J in a direction to make the screw-thread on the stem work down within the screw of the socket *k*, and when it is desired to increase or diminish the speed of the engine the valve may be raised or lowered, relatively to the rod *l*, to leave a greater or less portion of the openings *d d* uncovered while the balls revolve in a given plane. When the valve is screwed down into its two seats, the steam is entirely shut off from the openings *d d*; and the two seats and valve-faces are necessary for this purpose.

It will be observed that the lower part of the valve-box A is suspended within the casing C, and is entirely independent thereof, whereby the flow of steam is not impeded by any braces or other obstacle, but the interior of the casing is left entirely open and free. The valve-box, being thus independently suspended within the casing C, may be at any time unscrewed and removed therefrom, when the valve and all its adjuncts may be conveniently examined.

We do not confine ourselves to the use of any particular form or forms of openings *d d*, though we have represented in the drawings the diamond or rhombic form, and have herein stated that the quadrangular form is preferable; but

What we claim as our invention, and desire to secure by Letters Patent, is—

1. The arrangement and combination of the valve-box A and casing C, as and for the purposes herein shown and described.

2. The arrangement and combination of the screw-socket *k*, stem *j*, rod *l*, arm *p*, groove *q*, and hand-wheel J, so that by turning the hand-wheel J the stem *j* may be elevated and depressed, irrespectively of the rise and fall of the rod *l* and without rotating the latter, all as herein shown and described.

NATHAN C. TRAVIS.
NATHAN JOHNSON.
RICHARD EMERSON.

Witnesses:
WILLIAM G. PINCHARD,
HOWARD O. WARNER.